No. 765,433. Patented July 19, 1904.

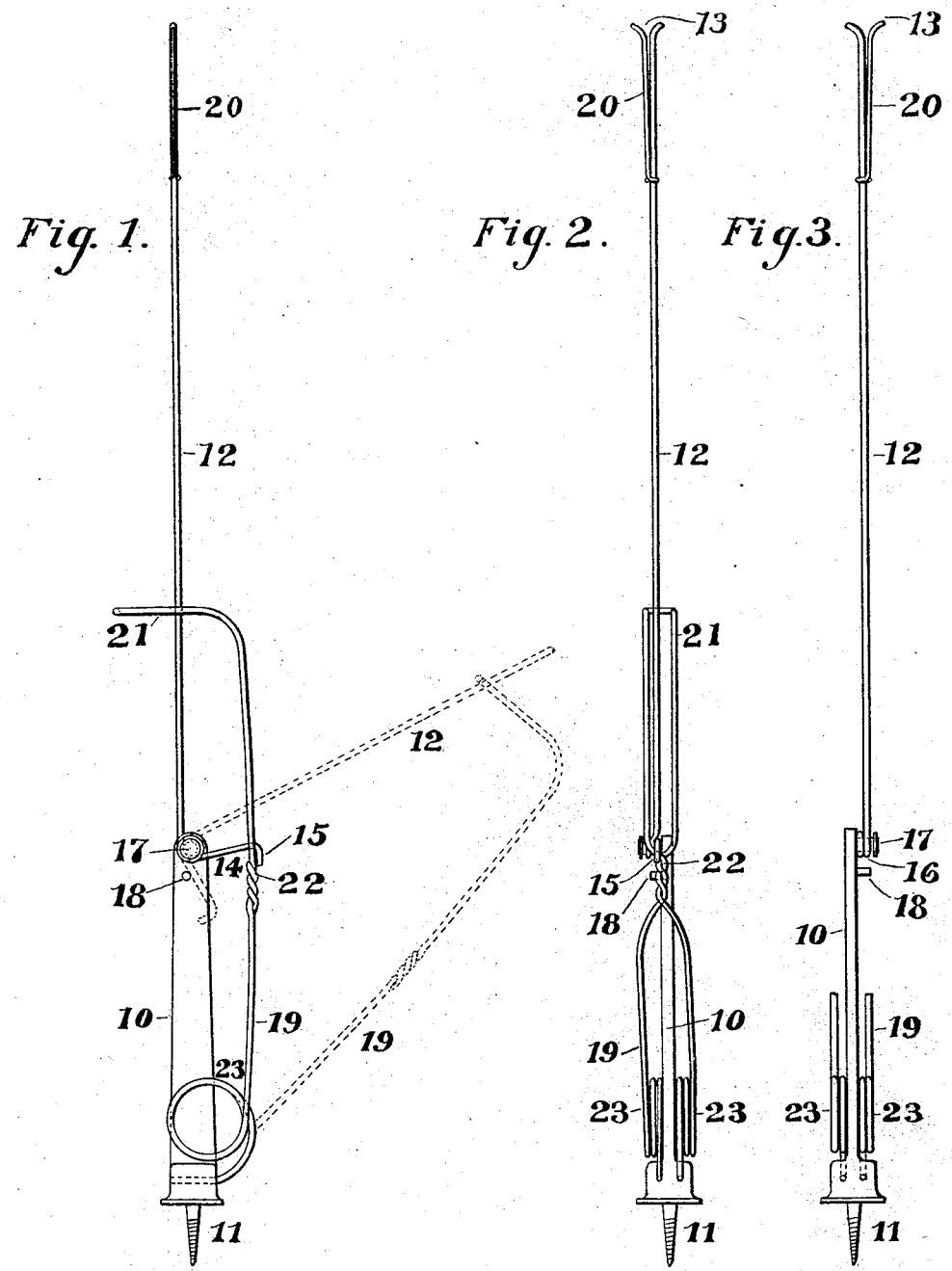

UNITED STATES PATENT OFFICE.

MAX F. MANGELSDORFF, OF UNION, NEW JERSEY.

FISHING DEVICE.

SPECIFICATION forming part of Letters Patent No. 765,433, dated July 19, 1904.

Application filed April 18, 1904. Serial No. 203,537. (No model.)

*To all whom it may concern:*

Be it known that I, MAX F. MANGELSDORFF, a citizen of the United States, and a resident of Union, in the county of Hudson and State of New Jersey, have invented certain new and useful Improvements in Fishing Devices, of which the following is a specification.

The invention relates to improvements in fishing devices; and it consists in the novel device hereinafter described to be secured upon the edge of a wharf, boat, or other convenient location for holding the line and imparting to the same a jerk when a fish pulls against the line for firmly embedding the point of the hook in the mouth of the fish.

The invention will be fully understood from the detailed description hereinafter presented, reference being had to the accompanying drawings, in which—

Figure 1 is a side elevation of a device constructed in accordance with and embodying my invention, the device being shown in its set or operative position by full lines and in its sprung or operated position by dotted lines. Fig. 2 is a front elevation of same; and Fig. 3 is a rear elevation, partly broken away, of same.

In the drawings, 10 designates a suitable standard having at its lower end a screw 11, by which said standard may be secured upon the edge of a wharf or boat or other convenient support, and 12 denotes a rod, preferably of wire, pivotally secured upon the upper end of the standard 10 and having at its upper end a wedge-shaped crotch 13 and at its lower end a short arm 14, whose outer end is of hook form, as at 15. The wire of which the rod 12 is made is preferably given a coil 16 to form an eye adapted to pass upon a pin 17 at the upper end of the standard 10 and coöperate with said pin in forming the pivotal connection of said rod with said standard, a washer or equivalent means being provided to retain said coil 16 upon said pin.

The standard 10 is provided with a stop 18, to be engaged by the catch-arm 14 when the rod 12 has been sprung, as shown by the dotted lines in Fig. 1, for limiting the movement of the rod 12 under the force of the spring 19, which acts in opposition to the pull of the fish.

The crotch 13 is preferably formed by bending the upper end of the rod 12 laterally and securing to the side of said rod a piece of wire 20, whose upper end is bent oppositely to that of the upper end of said rod, thereby between said ends forming a wedge-shaped crotch having smooth rounded surfaces and adapted to pinch, and thereby securely hold, the fishing-line when the latter is pressed down into the same.

The actuating-spring 19 is of wire and comprises a loop member 21, a cross-bar member 22, and a coil member 23, (or two thereof, if preferred, as shown,) the end of the wire at said coil being fastened in the standard 10. The spring 19 will preferably be formed of one rod of wire, doubled upon itself at about its middle to form the loop member 21 and then at a suitable point twisted together to form the cross-bar 22, whence the two ends of the wire rod extend downwardly and are coiled, as at 23, and finally secured to the standard 10. It is obvious, however, that one leg of the wire rod may after the formation of the loop member 21 terminate at the cross-bar 22, under which condition there would be but one coil 23. The loop member 21 loosely encompasses the rod 12, and the cross-bar 22 affords a convenient means to be engaged by the catch-arm 14 when the device is set, as shown in Figs. 1 and 2.

In the employment of the device the standard will first be secured in the desired position and then the rod 12 will be set—that is, turned to its vertical position and there caught by pressing the spring 19 upwardly toward it and engaging the catch-arm 14 onto the cross-bar 22, as shown. Thereafter the line will be thrown out to the proper extent, as usual, and then the line will be pressed into the notch 13 and be held by the same. When a fish takes the hook and pulls on the line, the upper end of the rod 12 will thereby be turned outwardly, (toward the left looking at Fig. 1,) and this will have the effect of moving the hook end of the arm 14 upwardly from the cross-bar 22 and releasing the spring 19 to act, whereupon the said spring will immediately pass to the position shown by dotted lines in Fig. 1, and in doing so its loop member 21 will engage and carry with it the rod 12, the latter being thereby quickly turned inwardly and caused to jerk the line held by it in opposition to the pull of the fish, with the result of embedding the hook in the mouth of the fish. The line may then be drawn in and the fish removed and the operation above described repeated.

When the device is set, the loop member 21 will extend outwardly beyond the rod 12, as shown, so that the pull exerted by the fish to spring the device need only be sufficient to turn the arm 14 upwardly from the cross-bar 22.

The device is comparatively simple and inexpensive of construction and comprises as its main parts the standard 10, the pivoted rod 12, spring 19, having the loop 21 to engage said rod at the proper time, and means, such as the catch-arm 14 and cross-bar 22, for holding the rod 12 stationary under the stress of said spring and permitting said spring at the proper time to act against said rod and jerk the line connected with it. It will be noticed that the arm 14 is in line with the pivot-pin 17, and hence that when the device is set the spring, then under tension, is enabled to hold the rod 12 in its vertical position and thereafter upon the release of the arm 14 throw said rod inwardly to jerk the line.

What I claim as my invention, and desire to secure by Letters Patent, is—

1. The fishing device comprising the standard, the rod pivotally mounted thereon and having the crotch adapted to pinch and thereby hold the line, a spring to exert its force against said rod and when sprung to give the line a jerk, and means for connecting said rod and spring and adapted to be released by a pull on the line to be connected with said rod; substantially as set forth.

2. The fishing device comprising the standard, the rod pivotally mounted thereon and having the wire 20 fastened thereon to form between said rod and wire the crotch adapted to pinch and thereby hold the line, a spring to exert its force against said rod and when sprung to give the line a jerk, and means for connecting said rod and spring and adapted to be released by a pull on the line to be connected with said rod; substantially as set forth.

3. The fishing device comprising the standard, the rod pivotally mounted thereon, the catch-arm connected with said rod, the spring having the loop member to encompass said rod and when sprung to actuate said rod and to thereby give the line a jerk, and the cross-bar connected with said spring and to be engaged by said arm; substantially as set forth.

4. The fishing device comprising the standard, the rod pivotally mounted thereon, the catch-arm connected with said rod at about its pivot-point, the spring connected with said standard and provided with a member to engage said rod above the pivot-point of the latter, and the cross-bar connected with said spring and to be engaged by said arm; substantially as set forth.

5. The fishing device comprising the standard, the rod pivotally mounted thereon, the wire spring having the loop member encompassing said rod, the twisted cross-bar member and the coil member, and the catch-arm connected with said rod and to engage said cross-bar; substantially as set forth.

6. The fishing device comprising the standard, the rod pivotally mounted thereon, the catch-arm connected with said rod at about its pivot-point, the spring connected with said standard and provided with the loop member which loosely encompasses said rod above its pivot-point and is free of said rod when the device is set so as to allow freedom of movement of said rod without the same bearing against said loop member when a fish pulls on the line, and the cross-bar connected with said spring and to be engaged by said arm; substantially as set forth.

7. The fishing device comprising the standard having the stop 18, the rod pivotally mounted on said standard, the catch-arm connected with said rod and to be arrested by said stop when the device is sprung, and the spring having a member to engage said rod above its pivot-point and also having a cross-bar to be engaged by said catch-arm; substantially as set forth.

Signed at New York, in the county of New York and State of New York, this 16th day of April, A. D. 1904.

MAX F. MANGELSDORFF.

Witnesses:
CHAS. C. GILL,
ARTHUR MARION.